Jan. 8, 1935.   A. W. ANTHONY, JR   1,986,913
GAS SCRUBBER SYSTEM
Original Filed Jan. 13, 1932
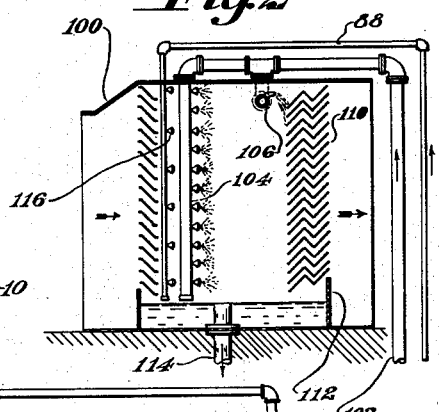
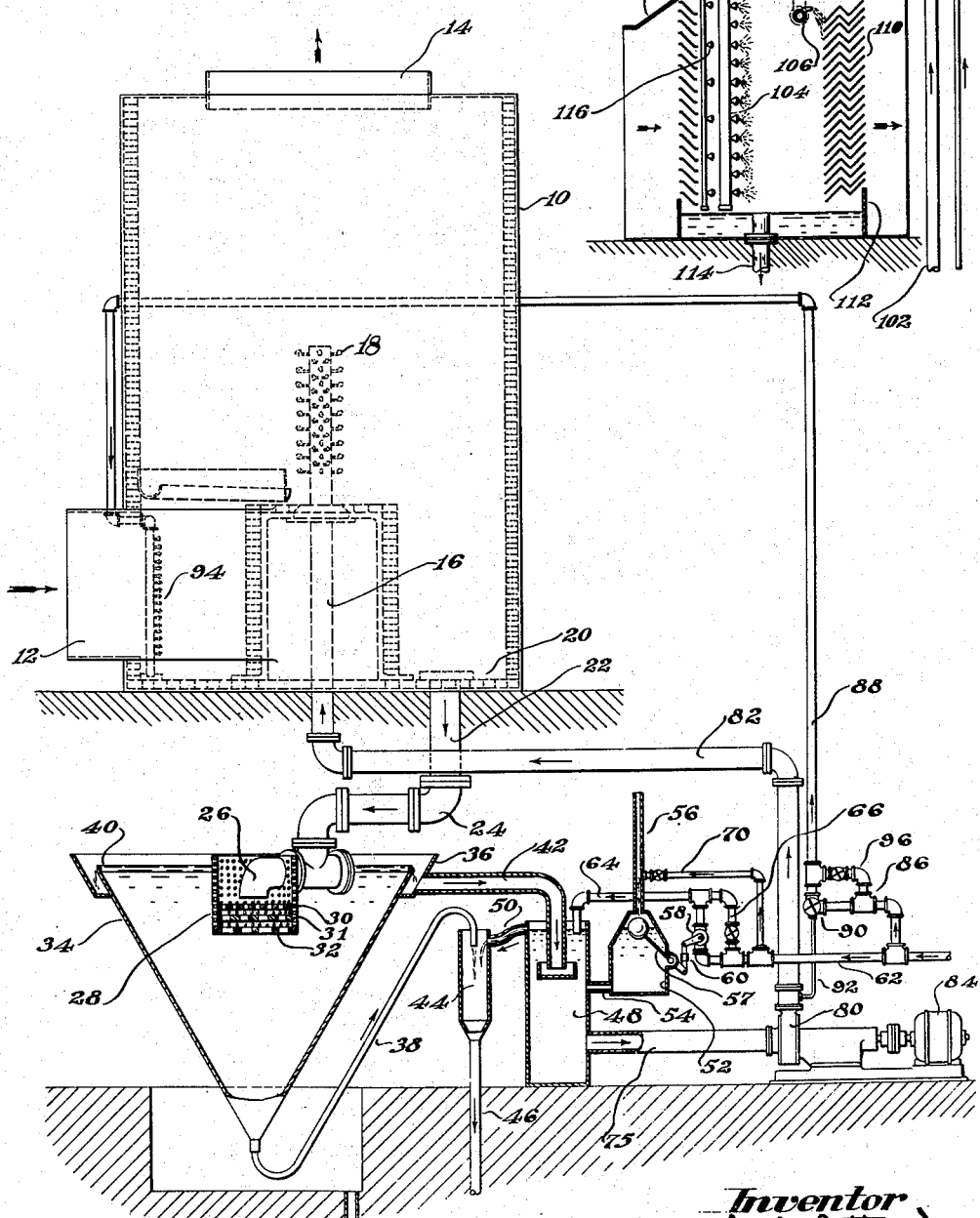

Patented Jan. 8, 1935

UNITED STATES PATENT OFFICE

1,986,913

GAS SCRUBBER SYSTEM

Alfred W. Anthony, Jr., Belmont, Mass., assignor to Pease, Anthony Equipment Co., Cambridge, Mass., a corporation of Massachusetts Application January 13, 1932, Serial No. 586,449
Renewed April 10, 1934

10 Claims. (Cl. 261—7)

The present invention relates to gas scrubber systems, and more particularly to such a system having provision for the cleansing and reuse of the water or equivalent fluid employed in the washing and removal of impurities from the gas.

Various suggestions have been made in the past having for their object the washing or treatment of gases such as flue gases by passing the gas through one or more sprays of water or equivalent washing fluid to remove impurities therefrom. This type of system is also generally employed in the removal of dust and similar articles from air. Where the volume of water required for washing the air or gas is not excessive, such a system is both practical and useful. In cases, however, where large volumes of hot gases such as flue gases must be washed, the volume of water required to be supplied quickly becomes excessive and involves an expense both for supplying and handling this volume which outweighs the advantage to be derived in the washing of the gases in this manner. In consequence substantially all installations of this character rely upon other and inferior methods of separation to remove a portion of carbon, cinders and similar materials from hot gases.

It is the purpose of the present invention to provide a system which is capable of successfully saving for reuse the major portion or bulk of the wash water except in so far as this water may be lost by evaporation within the gas, or by withdrawal for the purpose of conveying to waste the concentrated sludge separated from the wash water.

To this end I propose to collect dirty wash water constantly drained from the gas treating chamber, to substantially completely remove from this wash water both light and heavy materials, and to thereafter return the water cleaned of solid materials for reuse in the washing chamber. In the process of separation I waste merely sufficient water to maintain the removed solids in motion and permit of their discharge into an ash hopper or similar device. In order to accurately compensate for varying amounts of wash water wasted either through evaporation or discharge with solids, and to insure that an adequate and predetermined volume of water shall be sprayed into the treating chamber, I provide for the automatic admission of a variable volume of fresh make-up water which is designed to supply the varying need for this purpose, and insure a substantially constant or predetermined supply to the treating chamber.

I prefer to accomplish the recirculation of the wash water and its return to the treatment chamber by a pump or equivalent means, and in order to avoid cessation of treatment in the event of failure of the pump, I provide auxiliary spray devices which insure at least partial washing of the gas from this auxiliary source in the event of partial or complete cessation of operation of the main circulating pump or its equivalent. The introduction of the auxiliary spray is automatic, and depends upon reduction of pressure in the main circulating line.

In the accompanying drawing, Fig. 1 represents a simple and workable form of the invention, and illustrates particularly that portion of the system designed for the separation of impurities and recirculation of the water, with means for supplying make-up water in variable volume depending upon the need for such make-up, and Fig. 2 illustrates a modified form of gas washing construction suitable for combination with a recirculating system.

Referring particularly to the drawing, 10 represents the outer shell of a scrubbing or washing chamber designed for insertion in a flue gas conduit, preferably before the gases are delivered to the exhaust fan and thence to the stack. Gases may be admitted at the lower portion of the treating chamber through a tangential inlet 12, obviously connected with a conduit (not shown), and exhausted from the upper portion of the chamber through a centrally located outlet 14, which in turn is connected with a discharge conduit, presumably leading to an exhaust fan. With this construction the flue gases enter the lower portion of the chamber tangentially and spiral thereabout in an upward direction, finally exhausting from the central outlet, as indicated. A series of water sprays are directed generally radially of the chamber from a riser 16, extending upwardly from the bottom of the chamber and having a series of spray heads 18, these sprays, as will be obvious, radiating outwardly from the vortex of the gas column.

The dirty wash water, having removed from the flue gas solid impurities together with certain soluble materials, drains downwardly along the sides of the shell and is collected in the bottom portion 20. The bottom portion of the treating chamber is provided with a discharge conduit 22, as indicated, which connects through suitable elbows and T's 24 with a discharge head 26 located within a perforated or foraminous box 28. This box, as indicated particularly in the drawing, has perforated sides and a plurality of perforated partitions below the opening indicated at 30, 31 and 32. The partitions have progressively larger openings formed therein and are designed to effectually still and dissipate the entering stream of water delivered therefrom. This distributing assembly, as it may be termed, is positioned in the upper and generally central portion of an inverted cone 34, which is surrounded adjacent its upper rim with a bustle 36. The lower inverted apex of the cone is provided with a discharge pipe 38. With this construction dirty wash water continuously discharged through the waste pipe 22 and delivered to the inverted conical chamber 34 is separated from the bulk of solid impurities without further action, the relatively clear water passing over the dam 40 formed by the upper edge of the cone into the surrounding bustle 36 from which it is delivered to a communicating pipe 42. The removed impurities in the form of a semi-fluid mass flow upwardly through the pipe 38 and are thence discharged into a receiving tank 44 which communicates through a pipe 46 with an ash hopper or similar waste device (not shown). The relatively clear water delivered through the pipe 42 discharges into a second tank 48, which is in communication at its upper portion with the tank 44 through an overflow 50. The purpose of this connection is to permit the skimming from the upper level in this tank of light floating ash or similar ingredients which rise to the top of the water and which cannot readily be separated in the preceding tank 34. This ash predominates during the starting of boilers using powdered coal if the system is employed in connection with the cleansing of flue gases from this source, and the system contemplates provision for regulating the level in the skimming tank 48 to more readily remove these floating particles. For the purpose of regulating the level in the tank and for supplying a variable quantity of fresh make-up water as desired, I provide a float chamber 52 in free communication with the skimming tank through a conduit 54, the upper portion of the float chamber being open to atmosphere through a standpipe 56. The chamber 52 is provided with a regulating float 57, which is connected with a supply valve 58 through adjustable linkage 60.

With this construction the level in both the float and skimming chambers is maintained at a predetermined constant regardless of variation in waste water through a variable supply of fresh make-up, this supply being determined by automatic operation of the supply valve in accordance with the level in the fluid chamber. By varying the adjustable linkage connecting the float and valve, any desired level may be maintained within the float and skimming chambers, this level presumably being raised during the starting period of the boilers to expedite the skimming of light material therefrom.

The make-up supply valve 58 is located in the water supply line 62, and controls a delivery conduit 64 communicating with the skimming chamber. This conduit is additionally controlled through a valved by-pass 66. A constant trickle of fresh sweet water may be supplied through a smaller pipe 70 to avoid building up the acidity of the recirculated wash water. The main supply of wash water augmented by a variable fresh supply is delivered through the conduit 75 to a pump 80, and thence through a pipe 82 to the lower end of the standpipe 16 for reuse. The pump, as indicated, may be driven by an electric motor 84, all as will be evident to those skilled in the art.

For the purpose of automatically providing an auxiliary supply in the event of complete or partial cessation of the pump, I connect the main supply 62 through piping 86 with a water supply 88. Delivery of fresh water to the pipe 88 through the system 86 is controlled by an automatic pressure valve 90, which is in communication through the conduit 92 with the discharge side of the pump. Upon reduction of pressure below a predetermined amount in the pump discharge line, the valve 90 immediately opens automatically to permit delivery of water through the pipe 88 to an auxiliary spray device 94 located in the inlet of the treating chamber. A manually controlled by-pass 96 is connected about the automatic pressure valve 90 to permit manual control of the supply in the event of failure of this valve.

As illustrative of the application of the recirculating system employed in connection with a gas scrubbing device of the air washer type, I have shown in Fig. 2 a gas scrubber constructed along the lines of the conventional air washer. This scrubber is provided with a casing 100, having a water intake 102 which would form a continuation of the main water conduit 82, the intake 102 being connected with a series of nozzles 104 and a second series of nozzles 106. The first-mentioned series of nozzles are spaced throughout the cross-section of the incoming gas stream, and tend to deliver a series of sprays which completely intermingle with the entire body of gas. The second series of nozzles are intended to deliver spray upon the baffles 110, which are spaced within the chamber for the purpose of removing entrained moisture in a manner evident to those skilled in the art. The dirty water is collected in a sump 112 formed at the bottom of the chamber and is withdrawn therefrom through a standpipe 114, which communicates with the discharge 24 of the recirculating system. The auxiliary spray is introduced through the pipe 88 which is provided with a series of spray heads 116 disposed across the entrance of the treating chamber. Incoming gas flows through the treating chamber in the direction of the arrows, and is preliminarily engaged and washed by the treating sprays 104. Subsequently the treated gas passes through the series of baffles 110, which remove entrained moisture and wetted solid materials, the latter being collected in the sump formed at the bottom of the chamber.

With this system is will be evident that the bulk of the wash water is made available for reuse, that the supply delivered to the spray heads is maintained constant by automatically adding a variable supply of fresh water, and that in the event of failure of the supply, an auxiliary source is thrown into operation through reduction of pressure in the supply line.

It will be understood that the water, although substantially cleaned of solid impurities, nevertheless may derive an acid content from contact with the hot flue gases. However, the acidity of the recirculated water reaches a condition of equilibrium due primarily to the fact that the small amount of acid removed from the gas and added to the water is balanced by an equivalent amount of acid removed with the ash sludge. This acidity does not impair the washing function of the recirculated water, but does necessitate certain definite precautions in the construction and arrangement of materials, this construction and arrangement being more fully described and covered in my copending application about to be filed.

What is claimed is:

1. In a gas scrubbing system having a treating chamber and means for spraying washing fluid through said chamber, a clarifying tank, means for discharging dirty fluid into said clarifying tank, means for withdrawing clarified fluid from said tank and discharging same into a skimming chamber, means for withdrawing a portion of said fluid and floating solid material from said skimming chamber and discharging same from said system, means for adding fresh fluid to said system to compensate for the fluid withdrawn, and means responsive to the amount of fluid in said skimming chamber for determining the amount of fresh fluid added.

2. In a gas scrubber system having a treating chamber and means to spray a washing liquid through said chamber, a settling tank, means for discharging dirty liquid into said settling tank, means for discharging settled solid material and a portion of said liquid from said tank to waste, a skimming tank means for discharging the remaining portion of said liquid from said settling tank into said skimming tank, means for discharging floating solid material and the upper layer of the liquid in said skimming tank to waste, and means for returning the remaining liquid to said treating chamber.

3. In a gas scrubber system having a treating chamber and means to spray a washing liquid through said chamber, a settling tank, means for discharging dirty liquid into said settling tank, means for discharging settled solid material and a portion of said liquid from said tank to waste, a skimming tank, means for discharging the remaining portion of said liquid from said settling tank into said skimming tank, means for discharging floating solid material and the upper layer of the liquid in said skimming tank to waste, means for adding fresh liquid to said skimming tank, means responsive to the liquid level in said skimming tank for controlling the amount of fresh liquid added, and means for returning the remaining liquid and fresh liquid to said treating chamber.

4. In a gas scrubber system having a spray chamber, an inverted conical settling chamber, means for delivering dirty water centrally into the upper portion of the settling chamber, a conduit for withdrawing water from about the upper edge of the settling chamber, a skimming chamber, means for discharging clarified water into the skimming chamber, a waste chamber, means for conducting the upper layer of water from the skimming chamber to the waste chamber, means for conducting solid material from the lower portion of the settling chamber to the waste chamber, means for maintaining a constant level within the skimming chamber, and means for continuously delivering water from the skimming chamber to the spray chamber.

5. In a gas scrubber system having a spray chamber and means for spraying washing water through said chamber, a conical settling tank, means for discharging dirty wash water into the upper portion of the settling tank, means for distributing the stream of water before entrance into the tank, means for removing clarified water from the upper portion of the tank, a skimming tank into which clarified water is discharged, means for removing the upper layer of water from the skimming tank, means for automatically maintaining a predetermined level of the water within the skimming tank by the addition of make-up water, and a pump for returning the augmented bulk of water from the skimming tank to the spray chamber.

6. In a gas scrubber system having a treating chamber and means to spray a washing fluid through said chamber, means for discharging dirty fluid from said chamber into a clarifying tank, means for withdrawing clarified fluid from said tank, a pump for returning said clarified fluid to said chamber, and means responsive to the discharge pressure of said pump for supplying fresh washing fluid to said chamber upon failure of said pressure.

7. In a gas scrubber system having a treating chamber and means for spraying washing fluid therein, an inverted conical clarifying chamber in which solid materials settle downwardly from the fluid, means for directing dirty fluid from the treating chamber and for distributing said fluid into the uppermost portion of the conical chamber and centrally thereof, means for removing clarified fluid from the uppermost portion of the conical chamber into a separate and independent chamber, and means for automatically maintaining a substantially constant level of clarified fluid in the separate chamber through the addition of fresh make-up fluid thereto.

8. In a gas scrubber system having a treating chamber and means for spraying washing fluids through said chamber, a chamber for clarifying said fluid through the settling of impurities, means for continuously delivering dirty fluid to the chamber, means for continuously removing clarified fluid therefrom, and means for adding a variable amount of fresh make-up fluid to the used fluid after clarification.

9. In a gas scrubber system, a treating chamber, means for introducing gas tangentially at the lower portion of the treating chamber to cause the gas to traverse the treating chamber in an upwardly spiraling path, means for exhausting gas from the upper portion of the chamber through an outlet substantially less than the cross-sectional area of the chamber, centrally located means for spraying washing fluid radially outward through the gas as it spirals upward within the chamber, means for continuously conducting the dirty fluid from the lower portion of the treating chamber to a clarifying chamber for the separation and removal of solid materials, means for continuously removing clarified fluid from the chamber, means for thereafter adding to the clarified fluid a variable amount of fresh make-up fluid, and for thereafter returning the clarified fluid to the treating chamber through the centrally located spray means.

10. In a gas scrubber system, a treating chamber, means for introducing gas tangentially at the lower portion of the treating chamber to cause the gas to traverse the treating chamber in an upwardly spiraling path, means for exhausting gas from the upper portion of the chamber through an outlet substantially less than the cross-sectional area of the chamber, a series of centrally located spray means for delivering a series of outwardly directed washing fluid sprays through the gas within the chamber, means for continuously conducting the dirty fluid from the lower portion of the treating chamber to a clarifying chamber for the separation and removal of solid materials, means for continuously removing clarified fluid from the chamber, means for thereafter adding to the clarified fluid a variable amount of fresh make-up fluid, and for thereafter returning the clarified fluid to the treating chamber through the centrally located spray means.

ALFRED W. ANTHONY, Jr.